UNITED STATES PATENT OFFICE.

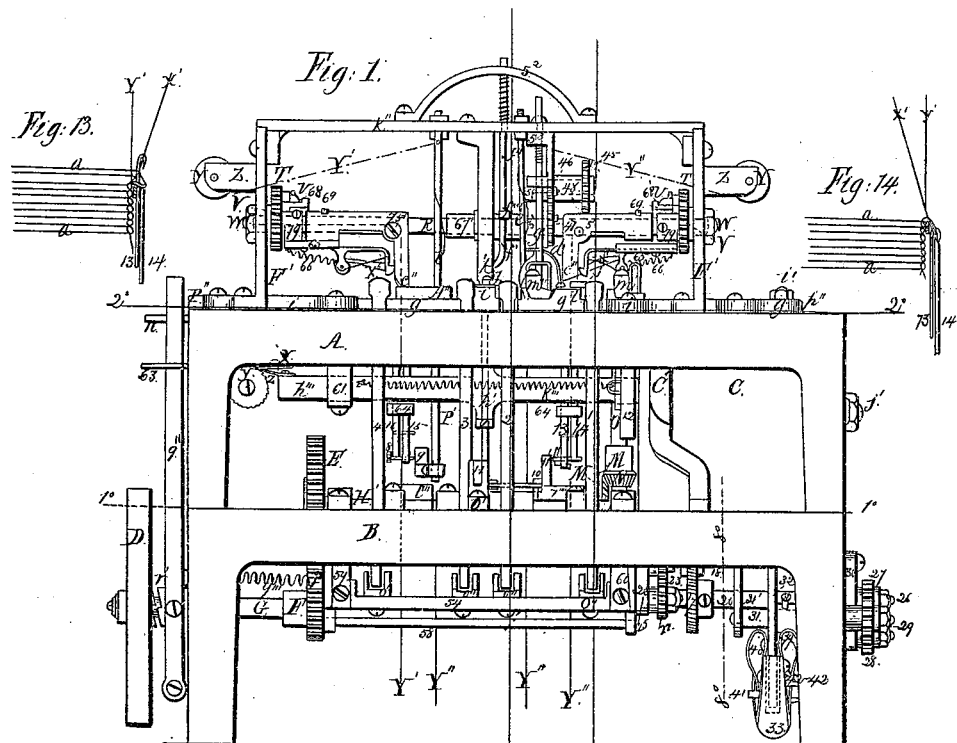

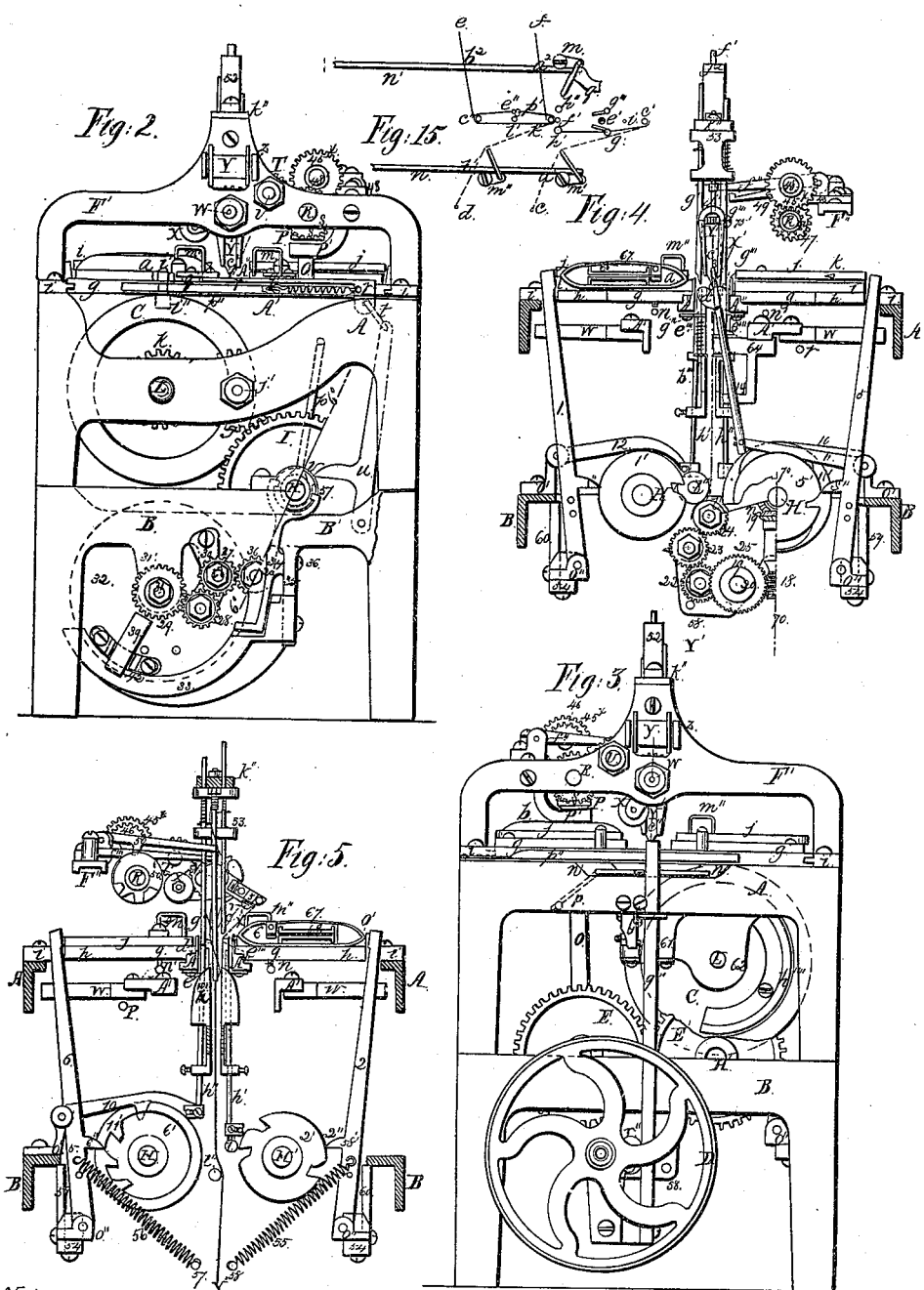

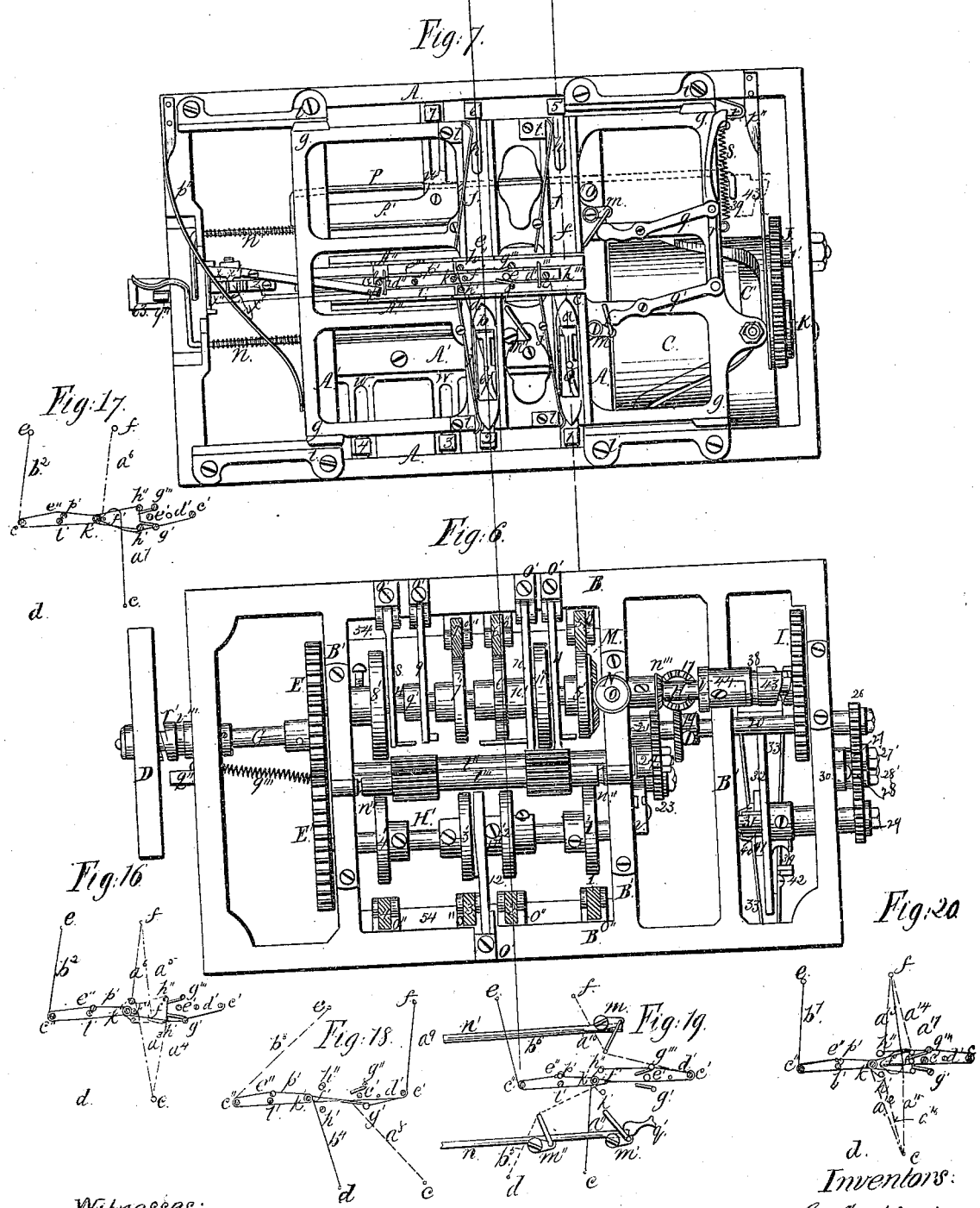

WILLIAM R. HARRIS, OF MANCHESTER, ENGLAND, AND GEORGE W. HARRIS, OF LOWELL, MASSACHUSETTS.

IMPROVEMENT IN MACHINES FOR WEAVING LOOM-HARNESS.

Specification forming part of Letters Patent No. 44,186, dated September 13, 1864.

*To all whom it may concern:*

Be it known that we, GEORGE W. HARRIS, of Lowell, in the county of Middlesex and State of Massachusetts, and WILLIAM R. HARRIS, of Manchester, England, (late of Middlebury, in the county of Addison and State of Vermont,) have invented new and useful Improvements in Machines for Making Weavers' Harness; and we do hereby declare that the following is a full, clear, and exact description of the same, reference being had to the annexed drawings, making a part of this specification, in which—

Figure 1 is a front elevation of our invention. Fig. 2 is a right end elevation, part being removed at line 6° 6° in order to show more clearly certain parts beyond; Fig. 3, a left end elevation. Fig. 4 is a vertical section on line 4° 4°, except the train of gears inclosed by line 7° 7° 7°, which is represented as seen in section at 8° 8°, Figs. 1, 6, and 7, looking toward left end. Fig. 5 is a vertical section on line 3° 3°, Figs. 1, 6, and 7, looking toward the right end. Fig. 6 is a horizontal plan and section of the parts attached to the frame B at and below the line 1° 1°, Fig. 1. Fig. 7 is a plan of the upper part of our invention, the arches F', cross-bars F'' and K'', and the parts connected thereto being removed on line 2° 2°, Fig. 1. Fig. 8 is a plan of sundry parts attached to arches F', cross-bars K' and F''. Fig. 9 is an end view of shuttle *a*, Fig. 7. Fig. 10 is a vertical section of the said shuttle, it being taken on line 5° 5°, Figs. 11 and 12. Fig. 11 is a plan and Fig. 12 is a side elevation of the said shuttle. Figs. 13 and 14 show the relative positions of the knotting-needles, twine, and twine-bars at certain stages of the operation, hereinafter described. Figs. 15, 16, 17, 18, 19, and 20 show the relative positions of the shuttle-twines and shipper strippers at different stages of the process of forming the heald, as hereinafter described.

We are aware that before our invention a machine has been made which so operated the heald-twine of the "light half" of a harness as to not only loop it properly but knit it to its back-band. In this machine, however, the eye and the "hard half" of the harness, as well as the leash, had to be made by manual labor, the connection of the same to the back-band being effected by a knitting mechanism.

In our machine we have mechanism for making the entire harness, no manual labor being required to make the hard half and the leash. Besides the above, we have connected with the harness-making mechanism certain other mechanism for interweaving with the light half of the harness what is termed a "bear-twine" or "tokening-thread," which is a thread for indicating every twenty or any other desirable number of eyes in the harness. Our machine also embraces mechanism for arresting its motions whenever any one of the twines of the shuttle-spools may become too slack or break, or when a shuttle-spool may have its entire twine drawn from it and requires to be replenished with more.

Our machine also further contains mechanism by which the machine will be caused to continue in operation until an entire harness may have been made by it, which having been accomplished the operations of the shuttles will be arrested for a period of time in order to enable the back band to be drawn through the machine the necessary length or distance for the commencement of another harness, which having been done the shuttles will again be put in operation for the making of this latter harness.

Furthermore, our machine contains a mechanism by which its entire operations may be arrested on the completion of a harness whenever it may be desirable to so stop the machine.

Having thus enumerated not only our automatic machine for weaving a harness, but its combination with other mechanism for producing effects or results as hereinbefore stated, we now proceed to explain the arrangement and construction of such machine and its auxiliary parts or mechanism.

First, we will describe the frame:

A and B represent the principal portions of the frame of the machine, it being made as clearly shown in Figs. 1, 2, and 3. A is the upper and B the lower half or portion of the frame.

B' represents the cross framing or girts in the lower half, B, of the frame. (See Figs. 2 and 6.)

A' and A'' represent the cross framing or girts in the upper portion, A, of the frame, the same being shown in Figs. 1, 2, 4, 5, and 7.

F' F' indicate arches rising from and secured to the upper part of the frame and connected at their tops by the longitudinal bars F'' and K''. (Shown in Figs. 1, 2, 3, and 8.) The said bars F'' and K'' are represented in section in Figs. 4 and 5. On the top of the bar K'' is secured the arch stand 52, as shown in Figs. 1, 2, and 8.

D is a pulley by which the machine is driven, the said pulley being so made as to run loosely on the shaft G; or it may be so constructed as to turn the said shaft when the clutch $r$, Fig. 1, may be thrown into connection with the pulley D by means of the lever $q''$, Fig. 1, and its fork $r''$, working in the clutch-groove $v''$, Fig. 6. The said clutch is drawn apart by a spring, $q'''$, attached to the lever $q''$, the whole being shown in Figs. 1, 3, and 6. On the shaft G is secured a small spur-gear, F, which engages with a larger gear, E, secured to a cam shaft, H. (See Fig. 6.) The said gear E meshes into another gear, E', of the same dimensions and fixed on another cam shaft, H'. These shafts H and H' are equally distant from the middle of the machine, are arranged longitudinally with respect to it, and rest in suitable bearings in the lower cross girts or framings, B' B' B, the whole being represented in Figs. 1, 2, 3, and 6. On the cam-shaft H is a bevel-gear, M, which engages with a bevel-pinion, N, fixed on a vertical shaft, J, which runs up through or nearly through the machine, and is supported at its lower end in a suitable bearing on cross-girt, B'. At its upper end the shaft O is supported by a stand, P', secured to a cross-girt, F''. (See Fig. 8.) On the upper end of the shaft O there is a bevel-gear, P, which engages with a gear, Q, fixed on a horizontal shaft, R, supported in arches F' F'.

Having thus described the frame and principal shafting and the connecting-gears thereof, we will now proceed to explain the first elementary part of the machine—viz., the machinery for supporting the back-bands at any required distance apart for any desirable depth of heald, and moving them in the order necessary for the operation of the shuttles.

Upon the arches F' F' are the stands Z Z, in which the back-band spools Y Y (see Figs. 1, 2, and 8) are supported. Through F' F' are secured the hollow studs W W, on which are fixed two elbow center points, $c'$ $c''$, (see Figs. 1, 2, 3, and 4,) at any desired distance apart by means of set-screws 67 and 69. For the purpose of obtaining the proper tension on the back-band twine, we place within the elbow center points friction-buttons 75, (see Fig. 4,) pressed together by springs, their pressure being regulated by a screw, 75', which passes through, but does not screw into the springs, but screws into the elbows $c'$ $c''$. (See Figs. 1, 2, 3, 4, and 8.)

Directly under the center points $c'$ $c'$ are rollers $l''$ $l'''$, which are supported in suitable bearings in or near the middles of the cross-girts B' B'. On the roller $l''$ is the roller $l'''$. $n''$ $n''$ are semicircular grooves made near the roller $l'''$ and near its bearings, and are for the reception of weight-hooks or springs for holding the roller $l'''$ more firmly against the roller $l''$, should the weight of the latter roller not be sufficient. The rollers $l''$ $l'''$ receive their motion through the train of gearing from the cam-shaft H in the following manner: Fixed on the shaft H is a bevel-gear, $n'''$, which engages with a corresponding gear, 17, (see Fig. 4,) placed on the upper end of shaft 18, on the lower end of which is cut a worm that drives a gear fixed on a shaft, 20. On the left end of the said shaft 20 there is a gear, 21, which meshes into another gear, 22, of like size, and supported on a stud fixed in the girt B'. 25 (see Fig. 6) is a swing stud and stand, which carries a gear, 23, that meshes into the gears 22 and 24. This latter gear is on the right end of the take-up roller $l''$. The gears 22, 23, and 24 may be changed for others of different diameters, such as may be desirable for the purpose of regulating the number of heddles to the inch, and of taking away the back bands or harness, as the same may be made.

The before-mentioned studs W W are made hollow in order that the back-band twines may pass through them. The said back-band twines or cords Y' Y' pass from the spools toward and through the hollow studs W W and along between the friction-buttons seen just above Y' in Fig. 4. Next they turn down around the pins 75', and drop vertically beyond points $c'$ $c''$ and inside of the twine-bars $d''$ $d''$, and thence pass between the take-up rollers $l''$ $l'''$, the whole being as represented in Figs. 1, 2, 3, 4, and 5.

The second elementary part of the machine—viz., a mechanism for knitting fastening-twines and the shuttle-twines to the back-bands—may be thus explained.

On the hollow studs W W, (see Fig. 1,) and next the arches F' F', are gears V V, kept in place by collars 79. (See Fig. 1.) To each of the gears V a spool-carrier, 68, (see Fig. 8,) is secured, on which is a spool, X, for the fastening-twine. A twine-guide, 65, is also attached to the gear V. This twine-guide has a screw-spring and friction-buttons, 76, (see Fig. 5,) for regulating the tension on the fastening-twine X'. 66 are springs on the guide 65, for the purpose of taking up any slack in the fastening-twines X' as they are carried around the back bands and the elbow center points, $c'$ $c''$. (See Figs. 1, 2, and 4.) The gears V V receive their motion from the shaft R as follows: At either end of the shaft R is a spur-gear, S, which meshes into another gear, T, supported by a stud, U. The gear T meshes into the gear V. (See Fig. 8.)

13 and 14, 15 and 16 (see Figs. 1 and 4) are hooks and needles supported properly by adjustable stands 64 64, through which such hooks and needles pass at a slight inclination from the vertical, and during each revolution of the cam shaft H are twice operated by levers 8 and 11 and cams 8' and 11'. (See Figs. 1, 4, and 6.) The upper ends of the said needles 14 and 16 run up just past the twine-bar $d''$. The hooks 13 and 15 run up past and to the right and left of the center points, $c'$ $c''$. (See Figs. 4, 7, 13, and 14.) In Fig. 13 the hook is shown at its greatest elevation, and in Fig. 14 at its lowest point of depression.

The two fastening-twines $X'$ $X'$ in their circuit around the elbow center points, $c'$ $c''$ are brought in contact with the hooks 13 and 15, and by the combined action of the hooks and needles 13 and 14, 15 and 16 are firmly knit to the back-band cords $Y'$ $Y'$, thus forming a "tress," which serves to hold the heald or shuttle twines to the back-bands.

The third elementary part of the said machine or automatic combination, consisting of mechanism for operating the two twines for forming the "light" and "hard" sides of the harness, may be described as follows:

$a$ and $b$ are shuttles containing twine-spools 68, arranged on proper spindles. Attached to the spindle of each of the shuttles, and on the top of such shuttles, is the twine guide 67. In the bottom of each of the shuttles are guides $69''$ and 70. On the sides of each shuttle are guides 71 and 72, with their springs 73 and 74, such device being for the purpose of taking up the slack of the twines and keeping them drawn to an equal tension at all times. Shuttle $a$ is used in forming the "knotted" side, and shuttle $b$ for weaving the "light" or "looped" side, of the harness.

From the cross-bar $k''$, and extending directly downward, is the center piece $k'$, the lower point of which reaches just below the girt $A''$ of the frame and serves not only to keep the two shuttle-twines extended in order that they may be the more readily looped together and the knot tied, but also for gaging the size of the eye.

On the cam-shaft H are clutches 43 and 44, (see Fig. 6,) the clutch 43 being so formed as to engage with a spur-gear, I. The said spur-gear is fitted so as to be capable of revolving loosely on the cam-shaft H, in order that the parts driven by this gear I may remain stationary whenever the said gear I may not be in contact with the clutch 43. The spur-gear I meshes into a gear, J, (see Fig. 7,) supported by a stud, $j'$. The gear J engages with another gear, K, affixed on a shaft, L, (see Figs. 2 and 3,) on which also is the cam C, which is provided with a cam-groove, C'. $g$ is a carriage or shuttle-box frame, kept in place by four guides, $i$, the middle portion of it resting on the girt $A''$. The guides $i''$ are secured to the upper part A of the frame. The said shuttle-box frame has four shuttle-boxes, $c$, $d$, $e$, and $f$, which during the operation of the machine will be driven in the order required from right to left and left to right by means of the cam C and a roller, $i''$, (shown by dotted lines in Fig. 2,) on a stud, $i'$, fixed in an ear of the frame $g$, the said roller $i''$ extending into the groove C' of the cam C. The cam C is used not only for the purpose of moving the shuttboxes, but also for holding them in the required positions for the movements of the shuttles back and forth in their respective boxes as the operation of forming the harness may require. The shuttle-boxes $c$ and $f$ are used for carrying the knotting-shuttle $a$ in the following manner: The shuttle $a$, being in the box $c$, as shown in Fig. 7, is carried from the right of the elbow's center point $c'$ and the back-band, as previously described, to the left of the fixed center piece $k'$, where it pauses. Next the shuttle is moved by the action of the picker-staff 3 from the box $c$ to the box $f$. The boxes then move to the right, the box $f$ carrying the shuttle $a$ to the right of the center piece $k'$. Next another pause of the shuttle-boxes takes place, during which the shuttle $a$ will be moved by the action of the picker-staff 6 from the box $f$ to the box $c$, and afterward, by the picker-staff 2, such shuttle will be thrown from the box $c$ to the box $f$. Again, by the picker 6 the shuttle will be thrown from the box $f$ to the box $c$. Next the shuttle-boxes move to the right, and the shuttle $a$ will be brought back to its starting point from the position of tying the knot in the same box $c$. When the boxes again pause the shuttle $a$ will be moved into the box $f$ by the picker 1. The shuttle $a$ has now made all the movements necessary in the formation of one eye of the harness.

The boxes $d$ and $e$ carry the shuttle $b$ for the light or looped side of the harness. At the same time that the shuttle $a$ is in position to pass to the left of the center point $K'$ the shuttle $b$ is in position in the box $d$ to cross to the left of the center point $c$, (see Figs. 1 and 7,) and the back-band cord $Y'$. When the picker 3 moves the shuttle $a$, the picker 4 moves the shuttle $b$ from the box $d$ to the box $e$. The boxes next move to the right, so as to permit the shuttle $a$ to pass just to the right of the center piece $k'$. The shuttle $b$ remains stationary during the time that the shuttle $a$ may be in the act of being thrown back and forth in the boxes $e$ and $f$. The shuttle-box $e$ carries the shuttle $b$ to the right of the center piece $k'$, while the box $c$ carries the shuttle $a$ to the right of the center point $c''$ and the back-band cord $Y'$. While the shuttle $a$ goes from the box $c$ to the box $f$ the picker-staff 6 will move the shuttle $b$ from the box $e$ to the box $d$. Thus we have completed all the necessary movements for the formation of one loop of the light side of the harness during precisely the same time in which the shuttle $a$ makes the necessary movements for the formation of the first eye of the hard or knotted side of the harness, as hereinbefore described.

During the time that the shuttle $a$ may be making the movements necessary for the formation of the second eye of the hard or knotted side of the harness the shuttle $b$ will repeat similar movements until the harness may have been completed.

In forming the second eye the shuttle $a$ will be carried from right to left by the box $f$, (instead of the box $c$.) Next it will pass from the box $f$ to the box $c$. Next it is carried by the box $c$, and from the left to the right of the center piece $k'$. Next the shuttle is carried from the right of the center piece $k'$ to the extreme right or starting-point in the box $f$, the said shuttle being next thrown from the box $f$ to the box $c$ by the picker-staff 5. Thus we have completed all the necessary motions of the shuttle-boxes $c$ and $f$ in the formation of the second eye of the harness.

These said operations are continued alternately until the whole harness may be completed or at the pleasure of the operator.

This alternate formation of the eyes or knotted side of the harness by the peculiar motions of the shuttle $a$, as above described, are for the purpose of forming the leash.

Attached to each of the shuttle-boxes $c$, $d$, $e$, and $f$ is a spring-catch, $j$, it being for the purpose of holding the shuttle in the box until such shuttle may be released by the force of the picker-staff, which, acting on the said spring, will throw the catch $k$ (see Fig. 4) on the spring $j$ (see Fig. 7) out of a recess in the shuttle. At $l\ l\ l\ l$ are suitable blocks of wood or other proper material, held in place by caps and screws. These blocks are for the purpose of preventing the shuttle from being thrown too far.

$p''\ p''$ (see Fig. 7) are springs at either end of the machine. They bear against the opposite ends of the carriage $g$, and not only assist the cam C in overcoming the inertia of the carriage at starting, but serve to assist in overcoming the momentum of the said carriage at the period of its being stopped at either end of its movement.

The picker-staves aforementioned are drawn inward by the contraction of the springs, as shown at 55 and 56 in Fig. 5, one end of each of the said springs being attached to the bars 57 and 58, and the other end to the pins $57'$ and $58'$ in the staves 2 and 6. The shuttles are thrown only when the notches in the cams come opposite to the points $2''$ and $6''$ on the picker-staves 2 and 6. Each of the staves 1, 2, 3, 4, 5, 6, and 7 is of the same pattern and is provided with a spring. They are moved outward by the cams $1'$, $2'$, $3'$, $4'$, $5'$, $6'$, and $7'$, fixed on the shafts H and H$'$, such being shown in Fig. 6. The said picker-staves 1, 2, 3, 4, 5, 6, and 7 have at their lower end the fulcra $o''\ o''\ o''\ o''\ o''\ o''$, secured to girts 54, they being affixed to the cross girts B$'$ B$'$ by the pendants 59 and 60.

On the inside face of the cam C is a cam, $h''''$, for moving to the left the vibrating bars $h'''$, the spiral spring K$'''$ (see Fig. 1) moving them to the right when the cam $h''''$ (see Fig. 1) may permit. The bars $h'''$ move in suitable bearings, 61 and 62, and support the vibrating fingers $h'\ h''$. (See Figs. 4 and 5.) The said fingers have suitable connections with levers 10 and 12, (see Fig. 4,) and are raised and lowered at proper times by the cams $10'$ and $12'$, fixed on the shafts H and H$'$. (See Fig. 6.) The said fingers $h'\ h''$ have thus imparted to them not only a vibrating but a rising and falling motion, and are used for the purpose of carrying out the twine in the form of a bow or loop from the center piece $k'$, such loop being for the passages of the shuttle in order to form the knot. The thin points of the tension-fingers $g'\ g'''$, extending past the wire $e'$, assist in making the second loop in the formation of the knot.

$f'$ (see Figs. 1 and 8) is a hinged needle, which is moved vertically by a cam, $v'$, fixed on a shaft, R, and acting on the lever $f''$, and moves it horizontally by acting on lever $f'''$, through which passes the needle $f'$ below the joint of the latter, such being as seen in Fig. 1. The object of this needle is to assist in the formation of the knot.

$g'\ g'''$ are tension-fingers, with their metal points extending past the wire $e'$ on either side of it. These fingers are fixed in a stand, 53, secured to a cross-bar, K$''$, and are operated by a cam, 50, acting on two levers, 49 and $50'$, arranged as shown in horizontal plan and section in Figs. 7, 15, 16, 17, 18, 19, and 20. The cam 50 is fixed to a spur-gear, 47, (see Fig. 1,) fitted loosely on a shaft, R. The gear 47 is driven by another gear, 46, (see Fig. 8,) situated directly above the said gear 47. The gear 46 is affixed to a short shaft, $48'$, which is supported in a bearing, 48. The bearing 48 is secured to the girt F$''$. On the opposite end of shaft $48'$ (see Figs. 2 and 4) is fixed the spur-gear 45, which is driven by a gear, 46, affixed to the shaft R, and is one-half of the diameter of the gear 45.

Under the fingers $g'\ g'''$ are other fingers, $g''\ g''''$, which are supported in suitable stands, $e'''\ e''''$, secured to girts A$''$ A$''$. The fingers $g''\ g''''$ are kept up by spiral springs through which they pass, and are only forced down by the action of the fingers $g'\ g'''$ for the purpose of tightening the knot.

To the wire $l'$ is attached both ends of a small wire, $e''$, (see Figs. 15 and 20,) which serves to keep one portion of the twine forming the looped side of the harness sufficiently extended to be caught by the lifting-finger $p'$. The finger $p'$ is operated by a cam, $9'$, (on the cam-shaft H,) by means of its connection with the lever 9.

The first auxiliary part of our invention is the mechanism for interweaving with the light half or either half of the harness a "bear-string" or tokening-thread, such mechanism being thus explained.

$z$ (see Fig. 9) is a pawl fixed at one end on bars $h'''$, and so arranged in relation to the ratchet-wheel $y$ that the latter will be moved one notch every time the vibrating bars $h'''$ are moved to the left. The ratchet-wheel $y$ has on its rear side a cam to operate on the lever $x'$. $x''$ (see Fig. 7) is a spool, the bear-twine from which is carried through the end of the lever $x'$ at $x$. The ratchet $y$ has usually forty teeth, and during each revolution of it it will operate the lever $x$ twice past the center point $c''$.

The next auxiliary part of our invention is the mechanism for arresting the motions of the machine whenever any one of the twines of the shuttle-spools may break or become slack or a shuttle-spool may have its entire twine run from it and require to be replenished with more, the said auxiliary part being described as follows, viz:

$m\ m'\ m''$ are shipper-trippers in connection with the rods $n\ n'$, (see Figs. 1, 3, 4, 5, and 7,) such trippers being for the purpose of forcing the shipper-lever $9''$ from its catch in the bracket 63, (see Fig. 3,) while the spring $9''$ causes the clutches at $r'$ (see Fig. 1) to separate. When this action may take place, the pulley D can turn freely on the shaft G. (Shown in Figs. 1 and 6.) The action of the machine will thus be stopped only when a heald-twine may be drawn entirely away from its spool or may become either too slack or be broken. Yoked levers $g\ g'$ (see Fig. 7) are made to act on the shipper-trippers $m\ m'$ (see Figs. 7, 15, and 19) alternately, one being free while the other is acted upon. The said levers $g\ g'$ are yoked together at their outer ends by a connecting-bar, $r$, (see Fig. 7,) which turns down at its rear end, in order to allow the long vibrating wire $t$ (see Fig. 7) to pass through it. The said wire $t$ is secured to a lever, $u$, which is operated one way by a cam, $v$, and the other by a spring, $s$, attached to the bar $r$ and to the carriage $q$, the arrangement being as shown in Figs. 2 and 7.

The next auxiliary part of our invention is for preserving the leash of the harness and maintaining the twines duly separated for the reception of harness-shafts.

$e'$ and $l'$ (see Fig. 1) are wires attached to the cross bar $K''$, and securely held in their places by nuts arranged both above and below the bar $K''$, the said wires extending just below the girts A. (See Fig. 5.) Attached to the wire $e$ is a smaller wire, $d'$, which is bent downward as shown in Fig. 1. The object of the wire $e'$ is to keep the heddles that form the front side of the knotted part from those that form the opposite side of the knotted part, or in other words keep the "leash." The small wire $d'$ is used for the purpose of carrying the twines that run from the eyes onto the back-band on one side of one-half of the harness farther out of center than those of the other side of the said half, thus making the distance from the eye to the back-band on one side greater than the distance of the eye to the back-band on the opposite side of the harness, the back-band being thereby thrown out of center, as will be understood by weavers. When it is not desirable to throw the back-band out of center, the wire $e'$ may be twined so as to bring the wire $d'$ into line with it and the center point $c'$. The wire $l'$ is for the purpose of keeping the twines that run from the eye to the back-band of the looped side separate from one another. In order to keep the leash and the looped side twines separate after they leave the wires $e'\ l'$, we use twines $Y''\ Y''$, passing from the back-band spools Y Y to and through the wires $l'\ e'$, (see Fig. 1,) thence down around them and through the lower ends of these wires and between the take-up rollers, thereby keeping the harness always in proper condition to receive harness-shafts.

The next auxiliary part of our invention, and which we shall now proceed to describe, is the mechanism by which the machine will not only be caused to continue in operation until an entire harness may have been made by it, but will have its shuttles or shuttle operating mechanism stopped in action so as to enable the back-bands to be drawn through the machine the necessary distance for the commencement of another harness, the shuttles being next thrown into operation for the production of this last-mentioned harness.

On the right end of the shaft 20, and outside of the part B of the frame, is a spur-gear, 26, (see Figs. 2 and 6,) which engages with one of equal diameter fixed on a stud, $27'$. 30 is a swing-bar depending from said stud $27'$ and carrying a stud on which runs an intermediate gear, 28, which meshes into the gears 27 and 29, fixed on a shaft, 31. The gear 29 may be changed for one of a different and suitable size, the object of so doing being to change the relative motions of the shafts 20 and 31. The shaft 31 has suitable bearings in pendants $31'$, projecting down from the frame, and has fixed upon it a disk, 32, provided with shipper-springs 39 and 40, and spring-guides 41 and 42. The lower portion of disk 32 is inclosed by a double spiral shield, 33, on and by which the shipper-springs 39 and 40 (see Fig. 1) are distended as they are carried around by the disk 32 from left to right. The said shield is secured to a pendant, 35, extending from the cross girt $B'$. The pendant 35 carries the pivot 36 of a clutch-shipper, 34, the lower end of which is forked and embraces the disk 32 just above the shield 33. The upper end of the shipper 34 is also forked and works in a groove, 38, of a clutch, 43, arranged as seen in Figs. 2 and 6. The object of the apparatus just described is to control automatically the length of the shade and the number of eyes therein, as well as the length of the blank in the back-bands. The disk 32 makes one revolution to each shade. The next auxiliary part of our invention is the mechanism by which the entire operation of the machine may be arrested on completion of a harness, it being as follows.

$p$ (see Fig. 2) is a shipping-rod, one end of which enters the groove 38 of the clutch 43. (See Figs. 6 and 7.) The other end of the said rod is so connected with the shipping-rod $n'$, before described, that the shipping of the clutch 43 will force the lever $9''$ (see Fig. 3)

from its catch in the bracket 63, thus stopping the entire machine, if desired, whenever the clutch 43 is thrown apart.

The object of the above-described invention is to obtain an automatic machine for making weavers' harness, the eyes thereof being formed as knit by hand, but in a far more perfect and rapid manner.

In operating our invention we supply the spools Y Y with back-band or foundation twines, and also with leash-twines wound on at the same time. The back-band twines Y' Y' pass through hollow studs W W, and along between the friction-buttons, (seen just above Y' in Fig. 4.) Next they turn down around the pins 75', and drop vertically beyond the points $c'$ $c''$, (see Fig. 1,) and inside of the twine-bars $d''$, and thence pass between the take up-rollers $l''$ $l'''$. The said rollers are for the purpose of taking away the harness, as it may be knit, and for regulating the number of eyes to the inch, any desirable number being obtained by changing the combination of gears, which give motion to the rollers. The depth of the heald is governed by the points $c'$ $c''$, which are adjustable at any desirable distance apart. The leash twines Y'' Y'' from spools Y Y run to the top of wires $c'$ $l'$, through which they pass and are wound around the wires once or twice, thence down through the machine, and between the rollers $l''$ $l''$. The spools X X are filled with fastening-twines, from which they run directly to staples in guides 65, and pass between buttons 76. (See Fig. 5.) Thence the fastening-twine proceeds to the eye in the guide, thence to tension-spring 66, thence to the eye in the extreme end of the guide, thence around the center points $c'$ $c''$, and is fastened to the back-band cord Y' Y', all as shown in Figs. 1, 2, 3, 4, and 5. The tokening spool $x''$ is supplied with bear-twine, which is drawn through the lever-guide at $x$, and fastened to the back-band at $c''$. (See Fig 7.)

The shuttles $a$ and $b$ are supplied with twines on their spools 68. Twine from $a$ is fastened to the back band cord at $c'$, twine from $b$ being carried around $k'$ to the left and fastened to the back-band cord at $c''$, as shown in Fig. 7.

The twines being now all in place, and the pulley D revolving by means of any suitable motor, we force the clutch $r'$ together by moving the lever $9''$ into the notch in the bracket 63. The spring 40 (see Fig. 6) on the disk 32, pressing against the lower end of the clutch-shipper 34, disconnects the clutch 43 from the gear I, in which case the carriage $g$, cam $c$, and the parts depending on their action will remain stationary while the cam shafts H and H' are revolving and operating the hooks and needles 13 and 14, 15 and 16, the fastening twine carriers 65, center needle $f'$, fingers $p'$ $g'$ $g''$ and $h$ $h''$, rollers $l''$ $l'''$, and disk 32. In this operation the back-band cords Y' Y' will be encircled by the fastening-twines X' X', and the said fastening-twines by the action of the hooks and needles 13, 14, 15, and 16, will be knit to the back-bands, which by the action of the rollers $l''$ $l'''$ will be properly taken through the machine. As the operation may continue the spring 39 and the disk 32 will be brought in contact with the clutch-shipper 34, and will press it to the left, and thereby connect the clutch 43 with the clutch on the gear I. This having taken place, the operation of the entire machine continues, as follows: The carriage, with its shuttle, commences to move to the left. When the shuttles $a$ and $b$ come opposite the picker staves 3 and 4, the carriage will be at the left extreme of its motion. In the meantime the twines $a'$ $b'$ will have been drawn against the shipper-trippers $m'$ $m''$, and will turn them outward, so as to clear the shipper-rod $n$. At the same time the lever 9 will have forced the shipper-tripper $m$ outward so as to clear the shipper-rod $n'$ in manner as shown in Fig. 15. The finger P' has at the same time raised the twine $b'$, and the vibrating finger $h'$ has been partly raised. The shuttles now move across from the boxes $c$ $d$ to the boxes $e$ $f$, the twine $b'$ passing around the center point $c''$ and hook 15. The twine $a'$ will then be around the parts $h'$ and $k'$ and under the raised portion of the twine $b'$, thus looping the two heald twines $a'$ and $b'$ together, the shuttle twines assuming the positions as shown by $a^2$ $b^2$ in Fig. 15. The finger $p'$ drops clear of the shuttle-twine $b'$, the carriage moves to the right until the shuttle $a$ comes opposite the picker 6 and draws the twine $b'$ against the hook 15. The fastening-twines $x'$ $x'$ having been carried under and past the points $c'$ $c''$ and the hooks 15 and 13, the said hooks commence to descend and close on the needles 16 and 14. The center vibrating needle, $f'$, will have been raised and vibrated to the right to the position $f$ in Fig. 16. The vibrating finger $h''$ in the meantime will have been raised to nearly half its extreme elevation. The shuttle $a$ is next thrown from the box $f$ to the box $c$, the twine of such shuttle passing over itself and assuming the position as shown at $b^2$ $a^3$, Fig. 16. The vibrating fingers $h'$ $h''$ next move to the right and carry the twine $a^3$, which assumes the position, as shown by $a^4$, $h'$, and $h''$ in Fig. 16, the finger $h'$ being raised in passing out to its extreme elevation, and thereby raising the twine $a'$. Next the shuttle is thrown from the box $c$ to the box $f$, going under twine $a'$ and over its own twine on the opposite side. The vibrating finger $h'$ immediately drops out of the way, the vibrating finger $h''$ rises to its extreme elevation, raising the twine on the side $h''$. The needle $f'$ moves back to its original position, carrying the twine $a'$ before it until it may be in the position as shown at $b^2$ and $a^6$ by full lines in Fig. 16. In the meantime the thin point of the tension-finger $g'''$ has dropped down on the twine between the fingers $h'$ and $h''$, depressing the front twines so much as to allow the shuttle to pass freely over them, it having passed under the back twine between the fingers $k'$ and $h'$, the shuttle-twines assuming the positions as shown by the full lines $b^2$ and $a^7$ in Fig. 17. The hooks and needles during this time have drawn the shuttle twines and the fastening-twine into the position as shown in Fig. 14. The finger $h''$ next drops over half-way down and the tension-finger $g'''$ rises clear of the twine. This being accomplished, the shuttle-box carriage begins to move to the right and the vibrating fingers to the left, the movement of the shuttle drawing the twine close upon the finger $h''$ until reaching the position in Fig. 18. The vibrating bars $h'''$ in carrying the fingers $h' h''$ to their extreme left have moved the ratchet-wheel $y$ one notch by the action of the pawl $z$ on the teeth of said wheel $y$. The hooks and needles 13, 14, and 15, 16 are now at their extreme elevations, as shown in Fig. 13. The shuttle $a$ crosses from the box $c$ to the box $f$. The shuttle $b$ goes from the box $e$ to the box $d$, as shown by the full lines $b^4$ $a^9$. The carriage next moves to the extreme left, the lever $v'$ at the start throwing the shipper-tripper $m'$ outward, so as not to come in contact with the shipping-rod $n$. The twines $a^{10}$ and $b^5$ throw the trippers $m$ and $m''$ outward, so as to clear the shipper-rods $n$ and $n'$, as seen in Fig. 19. In the meantime the tension finger $q'$ descends and pinches the twine $a'$ between it and the lower finger, $g''$, and draws said twine down over the tension-bar $e'''$ and tightens the knot around the center vibrating needle, $f'$. Next the finger $h'$ rises upward, the center heddle, $f'$, rises out of the knot of the heddle just now formed. The shuttle $a$ now crosses from the box $f$ to the box $c$. The shuttle $b$ also goes from the box $d$ to the box $e$, the shuttle $a$ passing between the finger $p'$ and the center piece $k'$, and thence under the twine $b'$, raised by the finger $p'$; thence over the twine on the front side of the harness, and between the rod $l'$ and the center piece $k'$. The finger $h'$ is also raised nearly one-half of its extreme elevation, so that the twine is caught on it. The twine $b'$ at the same time is brought in contact with the hook 15, as shown at $b^6$ in Fig. 19, the fastening-twine having in the meantime been passed around the points $c'$ $c''$ and the back-band twines by the aforementioned twine-carriers. The finger $p'$ immediately drops after the passage of the shuttles $a''$, showing the position of twine $a'$ at this period. The center needle moves to the right and up as the carriage moves to the right. The tension-fingers $g'$ $g'''$ again pull on the knot first formed and the vibrating finger $h'$ rises to catch the twine $a'$ on the front. As the shuttle $a$ comes to the picker 2 it will be thrown from the box $c$ to the box $f$, the twines assuming the positions as shown by $b^6$ and $a^{13}$ in Fig. 20. The vibrating fingers $h'$ $h''$ move to the right, the finger $h''$ at the same time being raised to its extreme elevation and carrying the twine $a'$ to the position $a^{14}$. The twine $a'$ being raised by the finger $h''$, the shuttle is passed from $f$ to $c$, going under the back twine and over the front one, as shown by $a^{15}$. The finger $h''$ drops and the finger $h'$ rises to its extreme elevation. The finger $g'$ drops and the thin point catches the twine between the vibrating fingers while the center needle, $f'$, moves the twine from the position $a^{15}$ to $a^{16}$. The needle $f$ going to the position $f'$, the shuttle $a$ will next pass from the box $c$ to the box $f$, going under the front twine and over the back one. Next the carriage moves to the right, the finger $h'$ drops partly down and moves to the left, while the twine closes on the needle, the said twine being drawn by the movement of the shuttle to the right. The finger $h'$ on reaching its extreme left position drops away from the twine, leaving the knot loosely formed, the pawl $z$ having again moved the wheel $y$ one notch. The shuttle-box carriage comes to the right extreme, the shuttles crossing from the boxes $e$ $f$ to the boxes $c$ $d$, and are then in the positions as at the commencement, such positions being as shown in Fig. 7.

As will be seen, two eyes will have been formed, both the twines leading to and from a knot of the first eye made, being laid on the front side of the back-band, or next the shuttle-boxes $c$ $d$, whereas both the twines leading to and from the knot of the second eye will have been laid in the rear of the said back-band. In this way the leash-twine Y" and the wire $e'$ will be inclosed in the hard side of the harness. The operation being carried on, the ratchet $y$ will be moved one notch at each heddle formed, and if continued until the said ratchet $y$ has made one-half of one revolution the bear-twine will be carried across the back-band in such manner that it will be knit into the said back-band by the knitting mechanism hereinbefore described. The operation is further continued until the disk 32 has made one revolution and the spring 40 has left the shield 33, and by pressing upon the forked lever 34 has forced the clutch 43 from its connection with the gear I, thereby causing the shuttle-boxes to remain stationary and preventing the further formation of eyes or heddles, the knitting of the back-band continuing until the spring 39 on the disk 32 may leave the shield 33 and press on the forked lever 34, and thereby cause the clutch 43 to be re-engaged with the gear I, which having taken place another shade or harness will be commenced.

If it be desirable to stop the entire machine at the end of any shade, the rod $p$ should be adjusted into the clutch-groove 38, so that when the clutch 43 may be disengaged the lever $q''$ will also disengage the clutch $r'$ with the driving-pulley D.

In our machine as above described each of the cam-shafts H H' makes but half a revolution during the formation of one heddle, the other or next heddle being completed during the succeeding half-revolution of each of the shafts. The result of this operation is the formation of what is termed the "leash" of the harness, which could not be made unless an even number of heddles were formed during each entire revolution of each of the said shafts.

The cam C, which operates the shuttle-box carriage, is so made, or should be so constructed and operated, as to produce the movements of the said carriage necessary to the formation of the two heddles while the cam-shafts H and H' make an entire revolution. By removing the tension-fingers $g'$ $g'''$ from the machine it will make what is termed a "single-knotted harness." By removing from the machine the fingers $h'$ $h''$ it will make while in operation what manufacturers term a "leash-harness," or one without eyes.

We do not claim as our invention a machine by which the heald twine of the light half of a harness has been so operated as not only to be looped properly, but knit to its back-band, the hard half of the harness being next made by manual labor and connected to its back-band by mechanism constituting part of such machine.

What we claim as our invention, and desire to secure by Letters Patent, is an automatic machine or combination composed of the following elements, viz:

1. Machinery for supporting the back-bands and moving them in the order required for the operation of the shuttles.

2. Mechanism for operating the two twines for forming the light and hard halves of the harness, and either with or without the eyes, substantially as hereinbefore specified.

3. Mechanism or means for encircling the back-bands with fastening-twines, and knitting or securing to the said back-bands the said fastening-twines, and certain other twines carried and operated by shuttles or their mechanical equivalents.

4. The combination of the said automatic machine and mechanism for interweaving with the light half of the harness a bear-string or tokening-thread, the whole being substantially as described.

5. The combination of the said automatic machine and a mechanism for arresting its motions whenever any one of the twines of the shuttle-spools may break or a shuttle-spool may have its entire twine run from it and require to be replenished with more.

6. The combination of the said automatic machine and mechanism by which the machine will not only be caused to continue its operation until an entire harness may have been made by it, but will have its shuttles stopped in their action, so as to enable the back bands to be drawn through the machine the necessary distance for the commencement of another harness, the shuttles being next thrown into operation for the production of this last-mentioned harness.

7. The combination of the same and a mechanism for drawing the back-bands through the machine the necessary distance for the commencement of another harness.

8. The combination of the said automatic machine and a mechanism by which its entire operation may be arrested on the completion of a harness.

9. The improved machine as not only provided with a shuttle-frame, $g$, movable substantially as described, and carrying the shuttles and moving them in directions longitudinally of the machine, and with respect to the back-bands, in the manner as explained, but as having its back-bands supported and operated substantially as specified.

10. The combination of the twines $Y''$ $Y''$ or their mechanical equivalents with harness-making mechanism, substantially as described.

11. The combination of the stationary center piece $k'$ with one or more shuttles, to be operated substantially as described, the purpose of the said fixed center-piece being hereinbefore specified.

12. The combination of the vibrating fingers $h'$ $h''$ with the stationary center piece $k'$ and one or more shuttles, operated or to operate substantially as described.

13. The combination of the vibrating guide needle or finger $f$ with the vibrating fingers $h'$ $h''$, the stationary center point $K'$, and one or more shuttles, operated or to operate substantially as specified.

14. The construction of the machine, substantially as described, to form the leash of the harness, it being accomplished by giving to the cam-shafts H and H' but half a revolution during the formation of each successive heddle, in manner and by means as specified.

WILLIAM R. HARRIS.
GEORGE W. HARRIS.

Witnesses for William R. Harris:
S. H. ROPER,
HENRY WILDE.

Witnesses for George W. Harris:
F. CURTIS,
F. P. HALE, Jr.